United States Patent [19]

Kajita

[11] Patent Number: 5,670,435
[45] Date of Patent: Sep. 23, 1997

[54] METHOD AND COMPOSITION FOR CLARIFYING WASTE WATER

[75] Inventor: Laura Kajita, Palatine, Ill.

[73] Assignee: AMCOL International Corporation, Arlington Heights, Ill.

[21] Appl. No.: 329,091

[22] Filed: Oct. 25, 1994

[51] Int. Cl.⁶ ..................... B01J 21/16
[52] U.S. Cl. ..................... 502/81; 502/80
[58] Field of Search ..................... 502/80, 81

[56] References Cited

U.S. PATENT DOCUMENTS

| | | | |
|---|---|---|---|
| 2,367,384 | 1/1945 | Tymstra et al. | 210/1 |
| 2,672,442 | 3/1954 | Clem | 252/8.5 |
| 3,213,037 | 10/1965 | Hodgkiss | 502/81 |
| 3,487,928 | 1/1970 | Canevari | 210/40 |
| 4,021,402 | 5/1977 | Clem | 260/42.12 |
| 4,149,968 | 4/1979 | Kupiec et al. | 210/28 |
| 4,332,693 | 6/1982 | Piepho | 252/181 |
| 4,415,467 | 11/1983 | Piepho | 252/181 |
| 4,462,470 | 7/1984 | Alexander et al. | 175/72 |
| 4,517,094 | 5/1985 | Beall | 210/664 |
| 4,613,542 | 9/1986 | Alexander | 428/290 |
| 4,624,982 | 11/1986 | Alexander | 524/446 |
| 4,650,590 | 3/1987 | Beall | 210/691 |
| 4,669,920 | 6/1987 | Dymond | 405/264 |
| 4,964,918 | 10/1990 | Brown et al. | 106/811 |
| 5,114,893 | 5/1992 | Hughes | 501/149 |
| 5,120,344 | 6/1992 | Libor et al. | 71/27 |
| 5,312,807 | 5/1994 | Hughes | 507/100 |
| 5,318,953 | 6/1994 | Hughes | 507/100 |

FOREIGN PATENT DOCUMENTS

| | | |
|---|---|---|
| 276954 | 8/1988 | European Pat. Off. . |
| 0 495 108 A1 | 7/1992 | European Pat. Off. . |
| 1 439 734 | 6/1976 | United Kingdom . |

*Primary Examiner*—Michael Lewis
*Assistant Examiner*—Thomas G. Dunn, Jr.
*Attorney, Agent, or Firm*—Marshall, O'Toole, Gerstein, Murray & Borun

[57] ABSTRACT

A chemical composition and method for treating oil-contaminated waste waters, and, more particularly, waste waters in the form of oily emulsions that may also contain dissolved metal ions, and/or metal solids, to sorb (adsorb and/or absorb) the contaminants between and within platelets of sodium bentonite clay particles, and calcium bentonite clay particles, and the contaminants are encapsulated or trapped in a matrix of calcium bentonite platelets and sodium bentonite platelets that are flocculated by a flocculant, such as a cationic polymer, so that leaching of contaminants into the waste water, or subsequently into a liquid portion of a landfill, is unexpectedly reduced.

28 Claims, 1 Drawing Sheet

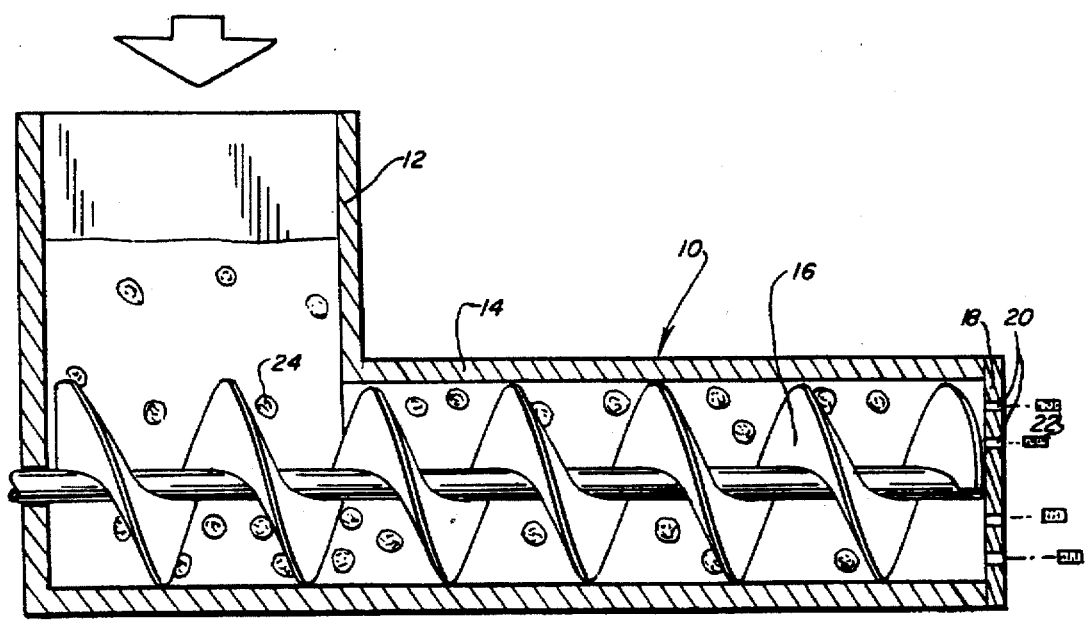

METHOD AND COMPOSITION FOR CLARIFYING WASTE WATER

FIELD OF THE INVENTION

The present invention is directed to a chemical composition and method for treating contaminated waste waters, particularly waste waters in the form of oily emulsions, that functions by sorption (adsorption and/or absorption) of oil contaminants and metals between platelets of calcium and sodium bentonite. The contaminants are encapsulated or trapped in a matrix of calcium and sodium bentonite platelets and a flocculant, preferably a cationic, polymeric flocculant, that flocculates and encapsulates the bentonite clays so that the contaminants resist being leached out into the waste water or into landfill leachate. Exceptional results are achieved by manufacturing the composition by extruding at least a calcium bentonite portion of the composition that includes the calcium bentonite, and preferably an acid and an alkali, to intimately mix the acid and the alkali with the calcium bentonite, and activate the calcium bentonite by shearing the platelets, and prevent substantial reaction of the acid and alkali with the sodium bentonite component of the composition. One extruded portion of the composition can be granulated to a desired granular particles size distribution having the acid/alkali bound to the calcium bentonite to prevent substantial reaction of the acid and alkali with the sodium bentonite component of the composition. Manufacturing the composition by extruding the calcium bentonite together with the acid and alkali—separately from the sodium bentonite portion—enables the extruded calcium bentonite/acid/alkali portion of the composition to disperse in the waste water quickly for sorption/reaction with the waste water contaminants prior to dispersion of the sodium bentonite portion of the composition. The calcium bentonite and sodium bentonite clays, containing sorbed oil, grease, and/or metals, then are flocculated, encapsulated, and removed from the waste water.

BACKGROUND OF THE INVENTION AND PRIOR ART

The widespread use of oils, fats, waxes, and metals in industrial operations, as in motor vehicle technology, in the material-removing treatment of metals in chemical manufacturing industries, refineries, and the like would lead to considerable environmental damage if the oil-emulsified waste waters were not pre-treated to remove a substantial percentage of oil and metal contaminants contained therein.

Numerous procedures have been devised for eliminating harmful substances from waste waters. One such procedure chemically reacts the oily water in monophase or polyphase systems, for example, by combustion or biological degrading (decomposition). This process, however, requires complex installations resulting in considerable expenditures. Furthermore, such methods include gaseous combustion by-products which, themselves, must be eliminated in order to avoid environmental damage.

Another known practice evaporates the water from an oily water emulsion, leaving the substances contained therein in concentrated form, whereby the concentrate may subsequently be deposited or burned in suitable places. The evaporation of the waste waters, however, requires a large amount of energy and is, therefore, not economically practical.

A further method of waster water treatment separates emulsified oils, fats or other floating substances in the waste water by chemically, thermally, electrically, or mechanically decomposing the emulsion and absorbing the precipitated substances. Yet another process separates out extremely fine dirt particles from the waste water by chemical flocculation and binds the separated dirt particles to a calcium hydrate compound. This process is carried out using iron-II salts, aluminum sulfate, calcium hydrate, and lime or sodium aluminate in conjunction with activated silicic acid.

The most usual method of treatment splits the emulsions by adding an electrolyte. The electrolyte serves to precipitate the oil, fat or other floating particles, for sedimentation and/or absorption.

Problems often arise in the adsorptive purification of the waste water because of deficient bonding of the oily substance to the adsorbing agent, whereby the oily contaminant is again liberated by environmental influences and its harmful effects develop anew.

Piepho U.S. Pat. Nos. 4,415,467 and 4,332,693 disclose a composition for treating oily emulsions. The compositions disclosed in these Piepho patents have been sold for years under license by the assignee of the present invention in the form of a powder and required both talc and acid-activated calcium bentonite components. In accordance with the present invention, however, it has been found that by extruding at least a calcium bentonite-containing portion of the composition of the present invention. Either the talc or the acid-activated calcium bentonite component, or both, can be completely eliminated from the composition, while achieving new and unexpected results in consistent clarification of waste waters.

Surprisingly, in accordance with one embodiment of the present invention, the addition of bentonite fines, as sodium bentonite fines, calcium bentonite fines, or mixtures, does not prevent the composition from sorbing or encapsulating the organic and metal contaminants. All of the sodium bentonite and calcium bentonite requirements for the compositions, therefore, can be in the form of fines (particles passing through a 50 mesh screen, U.S. Sieve Series), or can be a mixture of fines with larger sized sodium bentonite and calcium bentonite particles. The bentonite fines can be relatively pure sodium bentonite and/or calcium bentonite, or can be fines produced in the extruder that may contain alkali, acid and/or an organic sorbent, such as acid-activated calcium bentonite, talc or activated carbon components of the composition, from the extrusion of a previous batch. When the fines contain composition components, other than a bentonite clay, from the extrusion of a previous batch, it is preferred to incorporate 50% or less fines so that the percentage of each component of the composition can be determined with relative accuracy.

SUMMARY OF THE INVENTION

In brief, the present invention is directed to a composition and method for treating oil-contaminated waste waters, and, more particularly, waste waters in the form of oily emulsions that may also contain dissolved and/or solid metals, to sorb (adsorb and/or absorb) the contaminants between and within platelets of calcium bentonite and sodium bentonite clay particles, and the contaminants are encapsulated or trapped in a matrix of calcium bentonite platelets and sodium bentonite platelets that are flocculated by a flocculant, such as a cationic polymer, so that leaching of contaminants into the waste water, or subsequently into a liquid portion of a landfill, is unexpectedly reduced.

The composition includes granules of calcium bentonite and sodium bentonite clays, wherein at least a calcium bentonite component of the composition is manufactured by extrusion for sufficient shearing of the calcium bentonite platelets to activate the calcium bentonite and achieve unexpected sorption of waste water contaminants. In a preferred embodiment of the present invention an acid, and optionally an alkali, are bound to the calcium bentonite portion of the composition during extrusion so that the acid, and optionally the alkali, will not substantially react with a sodium bentonite portion of the composition. A flocculating agent, such as a polymeric flocculant, e.g., polyacrylamide, aluminum sulfate, ferric sulfate, talc, activated carbon or mixtures thereof, may be added to the composition, or added to the contaminated waste water separately, to flocculate the bentonite clay particles containing the sorbed contaminants for separation of the bentonite clay and contaminants from the clarified waste water.

Accordingly, one aspect of the present invention is to provide a chemical waste water treating composition capable of securely bonding or encapsulating contaminant material, from a waste water, between platelets of a bentonite clay for flocculation and subsequent removal of the clay and sorbed contaminants from the waste water.

Another aspect of the present invention is to provide a composition and method for clarifying contaminated waste water, wherein the composition contains an acid and an alkali so that when the composition is mixed with a waste water, the acid will instantaneously lower the pH of the waste water sufficiently to split apart a portion of the emulsified contaminants, particularly oils, so that the contaminants are more readily adsorbed between platelets of the bentonite clay. With further mixing and dissolving of the alkali, the pH of the waste water will be raised sufficiently to precipitate dissolved metals, and the precipitated metals also are trapped between bentonite clay platelets.

Another aspect of the present invention is to provide a composition and method for clarifying contaminated waste water, wherein a calcium bentonite portion of the composition is extruded, optionally with an acid and an alkali, to intimately mix the acid and the alkali with the calcium bentonite. The shearing activates the calcium bentonite clay platelets, while preventing the acid from interacting with a sodium bentonite portion of the composition.

Still another aspect of the present invention is to provide a composition and method for clarifying contaminated waste water, wherein the composition includes sodium bentonite; and calcium bentonite having clay platelets that are sheared by extrusion to activate the calcium bentonite clay to achieve unexpectedly better performance in removal of waste water contaminants and less leaching out of contaminants from the composition.

These and other aspects and advantages of the present invention will become apparent from the following detailed description of the preferred embodiments of the invention.

BRIEF DESCRIPTION OF THE DRAWING

The Figure shows an extrusion apparatus used to make the instantly disclosed compositions.

DETAILED DESCRIPTION OF THE PREFERRED EMBODIMENTS

The composition and method of the present invention are employed to sorb and encapsulate high quantities of waste water contaminants, particularly emulsified oily wastes and dissolved or solid metals, and encapsulate the contaminants so that they cannot be leached out back into the waste water, or into a landfill.

In one embodiment, the preferred composition of the present invention is manufactured in two separately manufactured portions or subcomponents (First Portion and Second Portion) by extruding a calcium bentonite component, that is not acid-activated, together with an acid and optionally an alkali, separately from the sodium bentonite component, to prevent the acid and alkali components from interacting or reacting with the sodium bentonite component of the composition. While the calcium bentonite-containing portion of the composition should be extruded to activate the calcium bentonite and bind any acid and alkali to the calcium bentonite, thereby preventing any acid and alkali from interacting with the sodium bentonite, it is not necessary to extrude the sodium bentonite-containing portion of the composition. In another embodiment, e.g., Example 11, neither an acid nor an alkali are required when an acid-activated calcium bentonite or talc or an organophilic clay is included in the composition.

The extruded calcium bentonite pellets, including bound acid and optionally alkali, are ground to a desired granular particle size distribution in the range of about 200μm to about 1000μm, and the ground granules from both Portions of the composition are combined into a single composition, together with a flocculating agent. Alternatively, the flocculating agent can be added separately to the waste water.

The First Portion and Second Portion of the composition are as follows, with amounts based on the total weight of the composition, except for the flocculating agent, which can be added separately in an amount of about 1% to about 10% based on the total weight of the composition:

|  | clay/chemical | Total Composition % | | | Subcomponent % | | | Mesh Size U.S. Sieve Series | |
|---|---|---|---|---|---|---|---|---|---|
|  |  |  | preferred | best |  | preferred | best |  | Preferred |
| First | Na bentonite | 10–55 | 15–40 | 27.9 | 50–100 | 50–96 | 82.9 | 200–1000 μm | <650 μm particularly |
| Portion | activated carbon | 0–10 | 1–10 | 1.0 | 0–30 | 2–15 | 2.9 |  |  |
|  | talc or acid-activated calcium bentonite | 0–10 | 1–10 | 2.2 | 0–30 | 2–15 | 6.5 |  | 300–600 μm |
| total subcomponent % |  |  |  | 33.7 | 100 | 100 | 100 |  |  |
| Second | Ca bentonite | 20–80 | 30–70 | 55.7 | 40–98 | 50–94 | 84.2 | 200–1000 μm | 300–850 μm |
| Portion | alkali, e.g., Ca(OH)$_2$ | 0–15 | 2–10 | 3.8 | 1–40 | 2–20 | 5.7 |  |  |
|  | activated carbon | 0–10 | 1–10 | 2.6 | 0–30 | 2–15 | 3.9 |  |  |
|  | acid, e.g., adipic | 0–15 | 2–10 | 4.2 | 1–40 | 2–20 | 6.2 |  |  |

| clay/chemical | Total Composition % | | Subcomponent % | | Mesh Size U.S. Sieve Series |
|---|---|---|---|---|---|
| | preferred | best | preferred | best | Preferred |
| total subcomponent % | | 66.3 | 100 | 100 | 100 |
| total composition % | 100 | 100 | 100 | | |

Flocculant addition (separately to the waste water, or with the composition) should be about 1% to about 15% based on the total weight of the composition (including flocculant), preferably about 1% to about 10%. The most preferred amount of flocculant is, with a polymeric flocculant, 3.4%, as shown in the following composition:

| | | | |
|---|---|---|---|
| First Portion | Na bentonite | 29.5% | ground to −30 |
| | activated carbon | 1.0% | +50 mesh |
| | talc or acid-activated calcium bentonite | 2.1% | (U.S. Sieve Series) (≅300–600 μm) |
| Second Portion | Ca bentonite | 53.9% | ground to −20 |
| | alkali (Ca(OH)$_2$)) | 3.6% | +50 mesh |
| | activated carbon | 2.5 | (U.S. Sieve Series) |
| | adipic acid | 4.0 | (≅300–850 μm) |
| polymeric flocculant | e.g., poly-acrylamide or PRAESTOL | 3.4 | |
| total | | 100% | |

The composition of the present invention includes a flocculating agent selected from the group consisting of a polymeric flocculant, talc, activated carbon, aluminum sulfate, ferric sulfate and mixtures thereof in an amount of about 1% to about 15%, based on the total weight of the composition.

Polymeric flocculating agents are preferred, including cationic, anionic and non-ionic flocculating agents, such as polyacrylamide or other high molecular weight, preferably cationic polymeric flocculants. The preferred cationic flocculant is a high molecular weight copolymer of acrylamide and a cationic derivative of acrylic acid, sold by Stockhausen of Greensboro, N.C. under the trade names Praestol 625 and Praestol 655.

Other useful flocculants include anionic polymeric flocculants, such as high molecular weight compounds containing such acid groups as a carboxyl group or sulfonic acid group or their salts, having the capacity of flocculating (coagulating) coarse grains in a suspension to form a floc (flocculated assembly). For example, the following are suitable homopolymers, and copolymers of such unsaturated carboxylic acids, such as acrylic acid, methacrylic acid and itaconic acid and their salts; partially hydrolyzed polyacrylamides; sulfonated derivatives of polyacrylamides; copolymers of acrylamide and styrenesulfonic acid or its salt; copolymers of (1) maleic acid or its salt and (2) vinyl acetate, vinylmethyl ether, or ethylene or other olefins; and polystyrenesulfonic acids and their salts. Such anionic high molecular weight flocculants are generally synthetic polymers of a high polymerization degree having a molecular weight of about 500,000 to about 20,000,000 and, as required, a nonionic polar group (such as, for example, —OH, —CONH$_2$, or —CN) is introduced into it to improve the flocculating performance. In the present invention, such anionic high molecular weight flocculant is generally used in an amount of 0.1 to 10 percent by weight of the composition, but may be used in an amount exceeding 10 percent. The anionic polymer may be impregnated into the sodium bentonite component of the composition, as disclosed in my parent application, or may be added to the composition, or to the waste water, separately, with or without a cationic or a non-ionic polymeric flocculant.

Such anionic high molecular weight flocculants are sold with such trade names as Himolock (produced by Kyoritsu Organic Industrial Laboratory), Accoflock (produced by Sankyo Chemical Co.), Sanflock (produced by Sanyo Chemical Co.), Magnifloc 831A (produced by Cytec), Kuriflock (produced by Kurita Industrial Co.), Aronflock (produced by Toa Synthetic Co.), Sumiflock (produced by Sumitomo Chemical Company, Limited), Diaclear (produced by Mitsubishi Chemical Co.), Separan (produced by Dow Chemical Co.), Aerofloc (produced by American Cyanamid Co.), Polyox (produced by Union Carbide Co.), and Goodlite (produced by Goodrich Chemical Co.).

Suitable non-ionic polymers include Magnifloc 905N (produced by Cytec), and other relatively high weight average molecular weight (e.g., 500,000 to about 20,000,000) polyacrylamides, polyacrylates, and the like.

Suitable organic sorbents include acid-activated calcium bentonite clay; organophilic clays that are well known in the art; activated carbon; and the like. These and other organic sorbents may be used alone or in any suitable combination.

In accordance with a preferred embodiment of the present invention, the composition is manufactured in two steps by extruding one portion of the composition, containing calcium bentonite, and optionally an acid and an alkali, together so that the acid, and preferably the alkali, are bound to the calcium bentonite, thereby preventing the acid and alkali from interacting with the sodium bentonite portion of the composition.

All components of the composition may be extruded, so long as any acid and alkali components are maintained separate from the sodium bentonite during the extrusion process. Further, when extruded with calcium bentonite, the acid and alkali disperse more quickly in the waste water to prepare the waste water for later flocculation by the sodium bentonite. Dispersing the acid as early as possible, and prior to dispersing the sodium bentonite, is important to break up the oil and grease emulsions. Dispersing the alkali as early as possible, and prior to dispersing the sodium bentonite, is important for precipitation of dissolved metals, so that the bentonite, later dispersed, can flocculate the oil, grease and precipitated metals, together with the flocculating agent. In the following examples, various compositions were manufactured by extruding all composition components in two separate composition portions and then grinding the two extruded composition portions into a desired granular particle size distribution.

EXTRUSION

When at least the calcium bentonite-containing portion of the composition is extruded, the finely divided extruded portion of the composition provides the calcium bentonite clay component with an increased ability to absorb/adsorb (sorb) organic contaminants, such as oil and grease, as well as dissolved metal ions and metal precipitates, from a contaminated waste water, as compared to the same smectite material without extrusion. Sodium and calcium bentonite are composed of layers, sheets or platelets (crystals) with the exchangeable cation occurring between the layers. The layers (crystals) are randomly oriented in crude clay particles. Extrusion, such as disclosed in the Simons U.S. Pat. No. 2,231,328, has been used to rupture the structure of the clay particle, while the clay particles are moist, by subjecting the particles to shear forces sufficient to break the clay particles along various randomly oriented shear planes corresponding to the flat plate surfaces of the bentonite particles.

Extrusion provides sufficient shear to separate the clay platelets enough to improve the sorption of organic contaminants and metal precipitates, and encapsulate the contaminants such that the contaminants unexpectedly resist being leached out of the clay, e.g., in a landfill. Extrusion aligns the flat plates of the clay structure in parallel relationship perpendicular to the axis of the die openings that the bentonite clay is extruded through. Apparently, it is this alignment that separates flat clay plates from each other that produces the unexpected increase in contaminant sorption and decreased leachability discovered in accordance with the present invention.

The calcium bentonite clay, and optionally the sodium bentonite clay, thus extruded, exit from the die opening in pellet form having the flat plates of the clay structure aligned perpendicular to the longitudinal axis of the pellet. The pellets break off from an exit end of the die opening when the pellet increases in length sufficiently to provide enough weight that the pellet breaks at the die opening exit. Alternatively, a cutting blade can be provided on the exit side of the extruder to cut the pellets to a convenient length.

The extrusion of the smectite clay(s) in accordance with the present invention is conveniently carried out by using either a pug mill or auger extruder. Pug mills have been commonly used in the production of bricks and other ceramic materials. In general, conventional pug mills include a tubular housing having one end open for receiving clay materials and the other end closed with a flat wall including one or more die openings for extruding the clay material therethrough. Pug mills useful in accordance with the preferred embodiment of the present invention are further provided with a longitudinal axis having one or more blades disposed radially thereon. In operation, the central axis is rotated to provide shearing forces to the material within the pug mill. The blades are inclined to a slight degree so that as they turn, they force the clay material forward, toward the exit or extruding end. In this way, shear pressure forces are applied to the smectite clay material within the pug mill. The amount or intensity of shearing forces imparted by the extrusion apparatus or pug mill, in accordance with the present invention, readily may be varied by changing the feed rate of smectite clay, blade size and/or blade angle, or the size of the extruding or die opening. Also, the rotation speed of the central axis driving the mixing or auger blades may be varied to change shear forces. The particular operating conditions and pug mill dimensions may be varied widely.

Application of shear pressure forces also conveniently may be applied utilizing a conventional auger extruder. Auger extruders are similar to pug mills except that the central rotating axis has a single or double screw type mixing blade which, when rotated in the appropriate direction, mixes and conveys the smectite clay toward and then through one or more die openings at the extruding end of the extruder housing. As with the pug mill, the particular dimensions, including the extruder port or die hole size and shape, and operating conditions may be varied widely to provide the smectite clay with differing degrees of clay platelet alignment and separation.

The most conventional way to regulate the degree of clay platelet alignment on the smectite clays is to change the size of the exit or extruder port. By varying the amount or flow rate of smectite clay flowing through the extruder port, the degree of clay platelet alignment can be regulated to desired levels.

Generally, the moisture of the clay should be in the range of about 20% to about 45% based on the dry weight of the smectite clay, when the clay is extruded. The extrusion is more efficacious when performed on rehydrated smectite clay rather than crude undried clay. If the clay is too dry, it would be forced through the die openings in a powdery form without sufficient platelet alignment and, therefore, insufficient improvement in sorption and encapsulation of contaminants. If too wet when extruded, the clay becomes very sticky and may very well clog the extruder.

Referring now to the drawing, there is illustrated an extrusion apparatus generally designated by reference numeral 10. The extrusion apparatus 10 generally includes a hopper 12 for maintaining a level of moist (i.e., 20–45% by weight water) smectite clay and other First Portion or Second Portion components, an elongated extrusion barrel 14 having a rotatable auger 16 disposed therein, and a die or extrusion plate 18 disposed at one extreme end of the extrusion barrel 14, including one or more die openings 20 for extruding aligned smectite clay pellets 22 therethrough. Clay particles 24 include a plurality of flat platelets randomly aligned throughout the clay mass 24.

The following examples show the improved results, resulting from extrusion of the calcium bentonite component of the composition, optionally with an acid, and an alkali, to prevent the acid from interacting with the sodium bentonite component. The First Portion of the composition, containing sodium bentonite, may also be extruded (separately from the Second Portion if an acid/or an alkali is included in the Second Portion of the composition), as shown in Examples 3 and 4. In the following Examples 1–4, the sodium bentonite used is American Colloid Company's SUPER GEL X® that is impregnated with 0.1 to 0.2 weight percent of an anionic acrylic acid/vinyl copolymer to increase the viscosity achieved upon mixing with the waste water. The amount of anionic polymer impregnation for the preferred polymer-impregnated sodium bentonite can be in the range of about 0.05% to about 5% by weight, preferably about 0.1% to about 2%, based on the dry weight of sodium bentonite impregnated. Alternatively, as shown in Examples 13, 14 and 17, an anionic polymer can be blended into the composition after extrusion and pulverizing, instead of impregnating the anionic polymer into the sodium bentonite. An anionic polymer is not necessary, as shown in Examples 5, 8 and 9.

EXAMPLE 1

|  | Clay/Chemical | Total % | Sample (1000 g) | Subcomponent % | U.S. Sieve Mesh size | % Component |
|---|---|---|---|---|---|---|
| First | Na bentonite* | 30.8 | 308 | 93.3 | −20 + 60 | 33% |
| Portion | Talc | 2.2 | 22 | 6.7 | | |
| Second | Ca bentonite | 56.4 | 564 | 84.2 | −20 + 60 | 67% |
| Portion | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| | Montello Mon Pac CMC** | — | — | 2 lb/ton | | |
| Dry blended | Praestol 625 | 40 lb/ton | | | −20 + 60 | 40 lb/ton |
| polymeric flocculants | Praestol 655 | 31 lb/ton | | | −20 + 60 | 31 lb/ton |

*Polymer-impregnated SUPER GEL X ®.
**Carboxymethylcellulose

EXAMPLE 2

|  | Clay/Chemical | Total % | Sample (1000 g) | Subcomponent % | U.S. Sieve Mesh size | % Component |
|---|---|---|---|---|---|---|
| First | Na bentonite* | 30.8 | 308 | 93.3 | −20 + 60 | 33% |
| Portion | Talc | 2.2 | 22 | 6.7 | | |
| Second | Ca bentonite | 56.4 | 564 | 84.2 | −20 + 60 | 67% |
| Portion | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| | CMC | — | — | 2 lb/ton | | |
| Dry blended | Praestol 625 | 40 lb/ton | | | −20 + 60 | 40 lb/ton |
| polymeric flocculants | Praestol 655 | 31 lb/ton | | | −20 + 60 | 31 lb/ton |

*Not polymer-impregnated.

EXAMPLE 3

|  | Clay/Chemical | Total % | Sample (1000 g) | Subcomponent % | U.S. Sieve Mesh size | % Component |
|---|---|---|---|---|---|---|
| First | Na bentonite | 28.2 | 282 | 83.0 | −30 + 50 | 33.7% |
| Portion* | Ca bentonite | 2.6 | 26 | 7.6 | | |
| | Acid-activated calcium bentonite | 2.2 | 22 | 6.5 | | |
| | Activated Carbon | | 10 | 2.9 | | |
| Second | Ca bentonite | 56.4 | 564 | 84.2 | −20 + 50 | 66.3% |
| Portion | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| Dry blended | Praestol 625 | 40 lb/ton | | | −20 + 50 | 40 lb/ton |
| polymeric flocculants | Praestol 655 | 31 lb/ton | | | −20 + 50 | 31 lb/ton |

*First Portion also extruded (separately from Second Portion).

EXAMPLE 4

|  | Clay/Chemical | Total % | Sample (1000 g) | Subcomponent % | U.S. Sieve Mesh size | % Component |
|---|---|---|---|---|---|---|
| First | Na bentonite | 30.8 | 308 | 89.3 | −30 + 50 | 34.3% |
| Portion* | Acid-activated calcium bentonite | 2.2 | 22 | 6.4 | | |
| | Activated Carbon | | 15 | 4.3 | | |
| Second | Ca bentonite | 56.4 | 564 | 85.2 | −20 + 50 | 65.7% |
| Portion | Calcium Hydroxide | 3.8 | 38 | 5.7 | | |

EXAMPLE 4-continued

|  | Clay/Chemical | Total % | Sample (1000 g) | Subcomponent % | U.S. Sieve Mesh size | % Component |
|---|---|---|---|---|---|---|
|  | Activated Carbon | 2.6 | 18 | 2.7 |  |  |
|  | Adipic Acid | 4.2 | 42 | 6.3 |  |  |
| Dry blended | Praestol 625 | 40 lb/ton |  |  | −20 + 50 | 40 lb/ton |
| polymeric flocculants | Praestol 655 | 31 lb/ton |  |  | −20 + 50 | 31 lb/ton |

*First Portion also extruded (separately from Second Portion).

The following Examples 5–9 all incorporate either the polymer-impregnated sodium bentonite clay of Examples 1–4, or an untreated sodium bentonite clay, to show that the sodium bentonite clay need not be polymer-treated for the compositions to perform well for sorption and encapsulation of waste water contaminants. In Examples 5–9, some of the First Portions of the composition were also extruded (separately from the Second Portion) to show that the compositions are effective with or without extrusion of the sodium bentonite-containing First Portion of the composition. Extrusion of the sodium bentonite-containing First Portion is not necessary to allow the calcium bentonite-containing Second Portion of the composition to interact with the waste water prior to the sodium bentonite/flocculant interactions. Also, Examples 1–4 do not include both talc and acid-activated calcium bentonite, both of which are disclosed to be essential in accordance with the Piepho U.S. Pat. Nos. 4,415,467 and 4,332,693; and Examples 5–9 include neither talc nor acid-activated calcium bentonite. Example 10 includes both talc and acid-activated calcium bentonite in extruded, granular form for comparison to the same composition in powdered (not extruded) form, as shown in Tables I–III.

EXAMPLE 5

|  | Clay/Chemical | Total % | Sample (1000 g) | Subcomponent % | U.S. Sieve Mesh size | % Component |
|---|---|---|---|---|---|---|
| First Portion* | Na bentonite** |  | 330 | 97.1 | −30 + 50 | 33.7% |
|  | Activated Carbon |  | 10 | 2.9 |  |  |
| Second Portion | Ca bentonite | 56.4 | 564 | 84.2 | −20 + 50 | 66.3% |
|  | Calcium Hydroxide | 3.8 | 38 | 5.7 |  |  |
|  | Activated Carbon | 2.6 | 26 | 3.9 |  |  |
|  | Adipic Acid | 4.2 | 42 | 6.3 |  |  |
| Dry blended polymeric flocculants | Praestol 625 | 40 lb/ton |  |  | −20 + 50 | 40 lb/ton |
|  | Praestol 655 | 31 lb/ton |  |  | −20 + 50 | 31 lb/ton |

*First Portion also extruded (separately from Second Portion).
**Not polymer-impregnated.

EXAMPLE 6

|  | Clay/Chemical | Total % | Sample (1000 g) | Subcomponent % | U.S. Sieve Mesh size | % Component |
|---|---|---|---|---|---|---|
| First* Portion | Na bentonite** | 28.2 | 330 | 97.1 | −30 + 50 | 33.7% |
|  | Activated Carbon |  | 10 | 2.9 |  |  |
| Second Portion | Ca bentonite | 56.4 | 564 | 84.2 | −20 + 50 | 66.3% |
|  | Calcium Hydroxide | 3.8 | 38 | 5.7 |  |  |
|  | Activated Carbon | 2.6 | 26 | 3.9 |  |  |
|  | Adipic Acid | 4.2 | 42 | 6.3 |  |  |
| Dry blended polymeric flocculants | Praestol 625 | 40 lb/ton |  |  | −20 + 50 | 40 lb/ton |
|  | Praestol 655 | 31 lb/ton |  |  | −20 + 50 | 31 lb/ton |

*First Portion also extruded (separately from Second Portion).
**Polymer-impregnated SUPER GEL X ®.

EXAMPLE 7

| | Clay/Chemical | Total % | Sample (1000 g) | Subcomponent % | U.S. Sieve Mesh size | % Component |
|---|---|---|---|---|---|---|
| First Portion* | Na bentonite** | 28.2 | 282 | 83 | −30 + 50 | 33.7% |
| | Ca bentonite | | 48 | 14.1 | | |
| | Activated Carbon | | 10 | 2.9 | | |
| Second Portion | Ca bentonite | 56.4 | 564 | 84.2 | −20 + 50 | 66.3% |
| | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| Dry blended polymeric flocculants | Praestol 625 | 40 lb/ton | | | −20 + 50 | 40 lb/ton |
| | Praestol 655 | 31 lb/ton | | | −20 + 50 | 31 lb/ton |

*First Portion also extruded (separately from Second Portion).
**Polymer-impregnated SUPER GEL X ®.

EXAMPLE 8

| | Clay/Chemical | Total % | Sample (1000 g) | Subcomponent % | U.S. Sieve Mesh size | % Component |
|---|---|---|---|---|---|---|
| First Portion* | Na bentonite** | — | — | 100 | −30 + 50 | 33.7% |
| Second Portion | Ca bentonite | 56.4 | 564 | 84.2 | −20 + 50 | 66.3% |
| | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| Dry blended polymeric flocculants | Praestol 625 | 40 lb/ton | | | −20 + 50 | 40 lb/ton |
| | Praestol 655 | 31 lb/ton | | | −20 + 50 | 31 lb/ton |

*First Portion not extruded; no talc; no acid-activated calcium bentonite.
**Sodium bentonite having a cation-exchange capacity greater than 100 milliequivalents per 100 grams and having a barrel yield of at least 200 — not polymer-impregnated.
REMARKS — EXAMPLE 8
Flocculated, and cleaned the waste water very well.

EXAMPLE 9

| | Clay/Chemical | Total % | Sample (1000 g) | Subcomponent % | U.S. Sieve Mesh size | % Component |
|---|---|---|---|---|---|---|
| First Portion* | Na bentonite** | — | — | 100 | −30 + 50 | 33.7% |
| Second Portion | Ca bentonite | 56.4 | 564 | 84.2 | −20 + 50 | 66.3% |
| | Calcium Hydroxide | 3.8 | 38 | 5.7 | | |
| | Activated Carbon | 2.6 | 26 | 3.9 | | |
| | Adipic Acid | 4.2 | 42 | 6.3 | | |
| Dry blended polymeric flocculants | Praestol 625 | 40 lb/ton | | | −20 + 50 | 40 lb/ton |
| | Praestol 655 | 31 lb/ton | | | −20 + 50 | 31 lb/ton |

*First Portion not extruded; no talc; no acid-activated calcium bentonite.
**Sodium bentonite having a cation-exchange capacity greater than 100 milliequivalents per 100 grams and having a barrel yield of at least 90 — not polymer-impregnated.
REMARKS — EXAMPLE 9
Flocculated, and cleaned the waste water very well.

EXAMPLE 10

| | Clay/Chemical | Total % | Sample (1000 g) | Subcomponent % | U.S. Sieve Mesh size | % Component |
|---|---|---|---|---|---|---|
| First Portion* | Na bentonite** | 28.2 | 282 | 83.0 | −30 + 50 | 33.7% |
| | Acid-activated Ca bentonite | 2.6 | 26 | 7.6 | | |

EXAMPLE 10-continued

|  | Clay/Chemical | Total % | Sample (1000 g) | Subcomponent % | U.S. Sieve Mesh size | % Component |
|---|---|---|---|---|---|---|
|  | Talc | 2.2 | 22 | 6.5 |  |  |
|  | Activated Carbon |  | 10 | 2.9 |  |  |
| Second | Ca bentonite | 56.4 | 564 | 84.2 | −20 + 50 | 66.3% |
| Portion | Calcium Hydroxide | 3.8 | 38 | 5.7 |  |  |
|  | Activated Carbon | 2.6 | 26 | 3.9 |  |  |
|  | Adipic Acid | 4.2 | 42 | 6.3 |  |  |
| Dry blended | Praestol 625 | 40 lb/ton |  |  | −20 + 50 | 40 lb/ton |
| polymeric flocculants | Praestol 655 | 31 lb/ton |  |  | −20 + 50 | 31 lb/ton |

*First portion also extruded (separately from Second Portion).
**Polymer-impregnated SUPER GEL X ®.

During the processing, e.g., grinding of Na bentonite and Ca bentonite clays, and during the extrusion process used on at least the Ca bentonite composition portion, the manufacturing process produces fine particles (the particles pass through a 50 mesh screen, U.S. Sieve Series). These fine particles would amount to a substantial quantity of waste material if the fines could not be reused, e.g., fed to the extruder in shearing at least the calcium bentonite portion of the composition. It was found that the fines can be reused by including the fines in the extruder, as 100% fines material, or as a blend with never extruded, new composition components, and re-wetting the fines so that the extruded composition has about 20% to about 45% by weight moisture, prior to extrusion. It was found that the compositions were best with less than about 50% recycled, previously extruded fines to prevent substantial contamination of the composition due to contaminants sticking to the fines from the extruder, so that the composition is known with some degree of accuracy.

The extruded compositions of Examples 8 and 9 (Ca bentonite portions extruded) and the composition of Example 10, in powdered form, for comparison to the extruded composition of Example 10 (including 50% by weight Na bentonite fines and 50% Na bentonite powder) were tested for clarification of a waste water obtained from Gyro Process of Bellwood, Illinois. The waste water had an initial pH of 11.4, which was lowered to about 9 with the addition of nitric acid. The Gyro Process waste water was treated with the different compositions and analyzed for oil and grease; turbidity; and heavy metals, as shown in Table I, at a composition dosage rate of 2 grams per 250 ml. of waste water.

TABLE I

| Metals | Untreated | Treated With Example 10 (powdered-not extruded) | Treated with Composition of Example 10 — 50% twice extruded fines, 50% Powder* | Treated with Example 8 | Treated with Example 9 |
|---|---|---|---|---|---|
| Cd | 0.09 | 0.01 | <0.005 | <0.005 | <0.1 |
| Cr | 2.48 | 0.06 | 0.05 | 0.05 | 0.05 |
| Cu | 4.98 | 0.96 | 0.67 | 0.69 | 0.71 |
| Ni | 1.18 | 0.01 | 0.01 | 0.01 | 0.01 |
| Pb | 0.61 | 0.05 | 0.03 | 0.02 | 0.04 |
| Zn | 13.9 | 0.59 | 0.15 | 0.15 | 0.16 |
| Fe | 550 | 17.7 | 14.7 | 14.1 | 14.2 |
| Ag | 0.01 | 0.005 | 0.03 | 0.003 | 0.06 |
| Ba | 0.02 | 0.03 | 0.01 | 0.01 | 0.01 |
| As | 0.05 | <0.02 | <0.02 | <0.02 | 0.03 |
| Hg | 0.03 | <0.02 | <0.02 | <0.02 | <0.02 |
| Se | <0.02 | <0.02 | <0.02 | <0.02 | <0.02 |
| Oil & Grease (PPM) | 527.5 | 142 | 62.5 | 59.5 | 61.5 |
| Turbidity (relative) | Very Cloudy | Cloudy | Clear | Clear | Clear |

*Both First Portion and Second Portion having the composition shown in Example 10. One half of each Portion taken from fines (<50 μm) formed from extrusion of a previous batch, one half of each Portion being a powder having a particle size less than about 200 mesh, U.S. Sieve Series.

In order to test the sludge materials (resulting from the waste water treatment) to see if they would resist leaching, TCLP (toxicity characteristic leaching procedure) was used. This test agitates a sample sludge in an extraction fluid to see if any metals or contaminants can be leached out of the sludge.

TABLE II

Gyro Process Waste Water
TCLP METALS ANALYSIS* (PPM)

| Metals | Example 10 (Powdered - not extruded) | Example 10 Granular (50% twice extruded fines, 50% Na bentonite fines) |
|---|---|---|
| Cd | 0.01 | <0.005 |
| Cr | <0.005 | 0.01 |
| Cu | 2.61 | 2.06 |
| Ni | 0.09 | 0.06 |
| Pb | 0.03 | 0.02 |
| Zn | 12.75 | 8.31 |
| Fe | 0.06 | 0.4 |
| Ag | <0.005 | <0.005 |
| Ba | 0.01 | 0.02 |
| As | <0.02 | <0.02 |
| Hg | <0.02 | <0.02 |
| Se | <0.02 | <0.02 |

*Federal Register, Vol. 51, No. 216, Nov. 7, 1986 Extraction fluid 2 was used.

The compositions also were tested on another different waste water sample to confirm the quality of the samples.
WASTE WATER SAMPLE: Maintenance Service, Milwaukee, Wis.

TREATMENT

The thick oil layer was skimmed from the samples first. The waste water was treated with the composition at a dosage rate of 2.75 grams per 250 ml. of waste water. The water was then agitated until complete flocculation and "cleaning" was achieved. The water was then filtered prior to testing. As shown in the following Table III, the extruded compositions removed the oil and grease and resulted in a clearer waste water that was substantially better than the powdered composition, even when 50% twice extruded fines were included in the extruded compositions.

TABLE III

| Tests | Untreated | Treated With Example 10 (powdered - not extruded) | Treated with Composition of Example 10 — 50% twice extruded fines, 50% powder* | Treated with Example 8 | Treated with Example 9 |
|---|---|---|---|---|---|
| Oil & Grease (PPM) | 1475 | 86.7 | 70.5 | 70.2 | 65.1 |
| Turbidity (relative) | Black Cloudy | Cloudy Yellow | Clearer Yellow | Clearer Yellow | Clearer Yellow |

*Both First Portion and Second Portion having the composition shown in Example 10. One half of each Portion taken from fines (<50 μm) formed from extrusion of a previous batch, one half of each Portion being a powder having a particle size less than about 200 mesh, U.S. Sieve Series.

TABLE IV

ICP METALS ANALYSIS (PPM)

| Metals | Untreated | Treated with Example 10 (Powdered, not extruded) | Treated with Composition of Example 10 — 50% twice extruded fines, 50% powder* | Treated with Example 8 | Treated with Example 9 |
|---|---|---|---|---|---|
| Cd | 0.27 | <0.005 | <0.005 | <0.005 | <0.005 |
| Cr | 0.86 | 0.05 | 0.03 | 0.03 | 0.04 |
| Cu | 1.71 | 0.03 | 0.01 | 0.02 | 0.03 |
| Ni | 0.46 | 0.22 | 0.22 | 0.23 | 0.22 |
| Pb | 1.28 | 0.05 | 0.03 | 0.06 | 0.06 |
| Zn | 2.32 | 0.11 | 0.06 | 0.06 | 0.06 |
| Fe | — | 4.52 | 3.95 | 4.06 | 4.09 |

*Both First Portion and Second Portion having the composition shown in Example 10. One half of each Portion taken from fines (<50 μm) formed from extrusion of a previous batch, one half of each Portion being a powder having a particle size less than about 200 mesh, U.S. Sieve Series.

The composition of Example 11 was tested on a waste water from Presstran, Inc. of St. Thomas, Ontario, in comparison to the composition of Example 11 in powder form (clay components were not extruded, but powdered to a size below about 50 μm). The waste water initially had a pH of 11, and, during storage and before testing, the pH of the waste water decreased to 7, so that the pH was raised again to 11 using NaOH, prior to treatment. The waste water was tested for oil and grease removal, turbidity, floc texture, and metals removal, as shown in Tables V and VI.

The composition of Example 11 is an extruded mixture of polymer-impregnated (0.1% to 0.2% by dry weight) sodium bentonite (American Colloid Company's SUPER GEL X®) together with calcium bentonite and acid-activated calcium bentonite, without an acid or an alkali. Since the composition does not include acid or alkali, all components of the composition, except for the flocculants, were extruded in a single portion (First and Second Portions are not required). In this embodiment of the invention, the extruded, pulverized sodium bentonite clay comprises about 15% to about 55% by weight; the extruded, pulverized calcium bentonite clay comprises about 40% to about 85% by weight; and the extruded, pulverized acid-activated calcium bentonite clay comprises about 1% to about 10% by weight of the composition, dry basis. However, acid-activated Ca bentonite is not available in the granular form and, therefore, if not extruded with the Na bentonite-containing portion of the composition, but combined in powdered form, the composition would not be homogeneous. The powdered form of acid-activated Ca bentonite, however, could be added to the waste water separately, and therefore, need not be extruded with either composition portion. Aluminum sulfate and Praestol 625 flocculants were dry blended into the granulated, extruded components. Surprisingly, the composition functioned to clean a waste water without the pH adjustment supplied by the acid and alkali of the earlier examples.

EXAMPLE 11

| Clay | Total % | Sample 1,000 g | Sub-component % | U.S. Sieve Mesh Size | % Component |
|---|---|---|---|---|---|
| Na bentonite* | 29.8 | 298 | 32.1 | −20 + 50 | 100% |
| Ca bentonite | 60.9 | 609 | 65.6 | | |
| Acid-activated calcium bentonite | 2.1 | 21 | 2.3 | | |
| Aluminum sulfate and | 7.2 | 72 | 144 lb/ton | −20 + 50 | 144 lb/ton |
| Praestol 625 flocculants dry blended | 39 lb/ton | | 39 lb/ton | −20 + 50 | 39 lb/ton |

TABLE V

TEST RESULTS ON PRESSTRAN WASTE WATER
Untreated and Treated

| TEST | Untreated Presstran Water | Treated Example 11 (Powdered - not extruded) | Treated Example 11 (Granular - extruded) |
|---|---|---|---|
| Oil and Grease (PPM) | 935 | 21.2 | 16.6 |
| Turbidity (Relative) | Cloudy Grey | Cloudy Yellow | Clear Yellow |
| RM-10 Floc Texture | — | Fair | Full/Strong |

TABLE VI

ICP METALS ANALYSIS (PPM)
28 Untreated and Treated Presstran Waste Water

| METALS | Untreated Presstran Water | Treated Example 11 (Powdered - not extruded) | Treated Example 11 (Granular - extruded) |
|---|---|---|---|
| Cd | 0.01 | <0.005 | <0.005 |
| Cr | 0.16 | 0.01 | 0.01 |
| Cu | 1.16 | 0.01 | 0.03 |
| Ni | 0.02 | 0.01 | 0.01 |
| Pb | 0.26 | 0.01 | 0.01 |
| Zn | 2.87 | 0.09 | 0.05 |
| Fe | 13.9 | 0.23 | 0.18 |

EXAMPLE 12

The composition of Example 11, modified by extruding the clay components with the aluminum sulfate flocculant, did not work well to clean the waste water, and produced a fine, weak floc. It is theorized that extrusion of the aluminum sulfate together with the clay components produced premature flocculation of one or more of the clay components, e.g., the sodium bentonite.

The following Examples 13 and 14 illustrate that the compositions of the present invention are effective without polymer-impregnation of the sodium bentonite component, and with the addition of an anionic polymer flocculant, or a nonionic flocculant, separately.

EXAMPLE 13

| | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second Portion | Ca bentonite | 42.1 | 842 | 84.2 | | |
| | Calcium Hydroxide | 2.8 | 57 | 5.7 | −20 + 50 | 66.3% |
| | Activated Carbon | 2.0 | 39 | 3.9 | | |

EXAMPLE 13-continued

|  | Clay/Chemical | Total % | Sample (2000 g) | Subcomponent % | U.S. Sieve Mesh size | % Component |
|---|---|---|---|---|---|---|
|  | Adipic Acid | 3.1 | 63 | 6.3 |  |  |
| Dry blended | Stokopol D2624* | 2 lb/ton |  |  | —20 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

*Anionic polyacrylamide.

EXAMPLE 14

|  | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second Portion | Ca bentonite | 42.1 | 842 | 84.2 |  |  |
|  | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | Cy—Ex* | 2 lb/ton |  |  | —20 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

*Anionic polyacrylamide.

In example 15, another cationic polymer was used in place of the Praestol polymers of the previous Examples.

EXAMPLE 15

|  | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second Portion | Ca bentonite | 42.1 | 842 | 84.2 |  |  |
|  | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended polymeric flocculants | Percol 753* | 71 lb/ton |  |  | —20 + 50 | 71 lb/ton |

*Percol 753 is a cationic high molecular weight polymer produced by Allied Colloide.

In the following Example 16, acid-activated calcium bentonite fines (below about 50 μm) were used in place of the larger particle size acid-activated calcium bentonite of Examples 3, 4, 10 and 11.

EXAMPLE 16

|  | Clay/Chemical | Total % | Sample (2000 g) | Subcomponent % | U.S. Sieve Mesh size | % Component |
|---|---|---|---|---|---|---|
| First Portion | Na bentonite* | 41.5 | 830 | 83.0 |  |  |
|  | Acid-activated calcium bentonite fines | 6.8 | 135 | 13.5 | −30 + 50 | 33.7% |
|  | Activated Carbon | 1.7 | 35 | 3.5 |  |  |
| Second Portion | Ca bentonite | 42.1 | 842 | 84.2 |  |  |
|  | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | Praestol 625 | 40 lb/ton |  |  | −20 + 50 | 40 lb/ton |

EXAMPLE 16-continued

EXAMPLE 16

|  | Clay/Chemical | Total % | Sample (2000 g) | Subcomponent % | U.S. Sieve Mesh size | % Component |
|---|---|---|---|---|---|---|
| polymeric flocculants | Praestol 655 | 31 lb/ton |  |  | −20 + 50 | 31 lb/ton |

*Polymer-impregnated SUPER GEL X ®.

REMARKS—EXAMPLE 16

The composition of Example 16 dispersed well in both the Gyro Process waste water and the Maintenance Service waste water. It also cleaned both waste waters well.

In Example 17, SAPP (sodium acid pyrophosphate) was included in the First Portion of the composition in an attempt to achieve faster dispersion of the sodium bentonite.

EXAMPLE 17

|  | Clay/Chemical | Total % | Sample (2000 g) | Subcomponent % | U.S. Sieve Mesh size | % Component |
|---|---|---|---|---|---|---|
| First | Na bentonite | 48.2 | 965 | 96.5 |  |  |
| Portion | SAPP | 0.1 | 2 | 0.2 | −30 + 50 | 33.7% |
|  | Activated Carbon | 1.7 | 35 | 3.5 |  |  |
| Second | Ca bentonite | 42.1 | 842 | 84.2 |  |  |
| Portion | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | Praestol 625 | 40 lb/ton |  |  | −20 + 50 | 40 lb/ton |
| polymeric flocculants | Praestol 655 | 31 lb/ton |  |  | −20 + 50 | 31 lb/ton |

In Examples 18 and 19, anionic polyacrylamide polymers having weight average molecular weights of about 10,000,000 to about 14,000,000 (MAGNIFLOC 831A and ACCOAL FLOC 215) were dry blended into the composition together with the cationic Praestol polymers:

EXAMPLE 18

|  | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second | Ca bentonite | 42.1 | 842 | 84.2 |  |  |
| Portion | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | Magnifloc 831A* | 2 lb/ton |  |  | —14 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

*Anionic polymer (MAGNIFLOC 831A)

REMARKS—EXAMPLE 18

The composition of Example 18 cleaned the Gyro Process waste water and had a fair/good floc.

EXAMPLE 19

|  | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second | Ca bentonite | 42.1 | 842 | 84.2 |  |  |
| Portion | Calcium Hydroxide | 2.8 | 57 | 5.7 | −20 + 50 | 66.3% |
|  | Activated Carbon | 2.0 | 39 | 3.9 |  |  |

EXAMPLE 19-continued

|  | Clay/Chemical | Total % | Sample (2000 g) | Subcomponent % | U.S. Sieve Mesh size | % Component |
|---|---|---|---|---|---|---|
|  | Adipic Acid | 3.1 | 63 | 6.3 |  |  |
| Dry blended | Accoal Floc 215* | 2 lb/ton |  |  | —10 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

*Anionic polymer (ACCOAL FLOC 215)

REMARKS—EXAMPLE 19

The composition of Example 19 flocced well, but did not clean the Gyro Process waste water as well as Example 18.

In Example 20, a non-ionic polyacrylamide polymer (MAGNIFLOC 905N) was dry blended into the composition together with the PRAESTOL cationic polymers. Otherwise, the composition of Example 20 was the same as the composition of Examples 18 and 19:

EXAMPLE 20

|  | Clay/Chemical | Total % | Sample (2000 g) | Subcomponent % | U.S. Sieve Mesh size | % Component |
|---|---|---|---|---|---|---|
| First Portion | Na bentonite | 50 | 1000 | 100 | −30 + 50 | 33.7% |
| Second Portion | Ca bentonite | 42.1 | 842 | 84.2 |  |  |
|  | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | Magnifloc 905N | 2 lb/ton |  |  | —10 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

REMARKS—EXAMPLE 20

The composition of Example 20 flocced well as cleaned the Gyro Process and Maintenance Service waste waters well and provided a good floc without harse agitation.

EXAMPLE 21

|  | Clay/Chemical | Total % | Sample (2000 g) | Subcomponent % | U.S. Sieve Mesh size | % Component |
|---|---|---|---|---|---|---|
| First Portion | Na bentonite* | 50 | 1000 | 100 | −30 + 50 | 33.7% |
| Second Portion | Ca bentonite | 42.1 | 842 | 84.2 |  |  |
|  | Calcium Hydroxide | 2.8 | 57 | 5.7 | −20 + 50 | 66.3% |
|  | Activated Carbon | 2.0 | 39 | 3.9 |  |  |
|  | Adipic Acid | 3.1 | 63 | 6.3 |  |  |
| Dry blended | HVP 90** | 2 lb/ton |  |  | —10 + 50 | 2 lb/ton |
| polymeric | Praestol 625 | 40 lb/ton |  |  | −20 + 50 | 40 lb/ton |
| flocculants | Praestol 655 | 31 lb/ton |  |  | −20 + 50 | 31 lb/ton |

*Not polymer-impregnated.
**An anionic acrylic acid/vinyl copolymer. The thickness (viscosity) of the waste water can be lowered to a more suitable level by incorporating the anionic copolymer in an amount of about 1 to about 1.5 pounds per ton of the composition.

REMARKS—EXAMPLE 21

The composition of Example 21 cleaned the Gyro Process waste water well and had a good floc.

What is claimed:

1. A method of manufacturing a composition for the treatment of contaminated waste water comprising sodium bentonite, and calcium bentonite for absorption and encapsulation of a contaminant selected from the group consisting of oil, grease, metals and mixtures thereof, said composition including an acid for lowering the pH of the waste water and break oily emulsions, said method comprising:

extruding a portion of the composition comprising the calcium bentonite and the acid, at a moisture content in the range of about 20% to about 45% by weight, to bind the acid to the calcium bentonite and prevent substantial reaction of the acid with the sodium bentonite;

maintaining the sodium bentonite in a separate composition portion, separate from the acid and calcium bentonite during extrusion of the calcium bentonite and the acid so that the sodium bentonite is not extruded with the acid;

pulverizing the extruded calcium bentonite to a desired powdered or granular particle size distribution; and combining the sodium bentonite with the calcium bentonite and the acid to form the composition.

2. A method in accordance with claim 1, further including adding a flocculant to the composition in an amount sufficient for flocculation of the contaminants sorbed in the composition.

3. A method in accordance with claim 1, wherein the composition includes activated carbon.

4. A method in accordance with claim 1, wherein the composition includes an organophilic smectite clay organic sorbent.

5. A method in accordance with claim 1, further including adding an alkali to the calcium bentonite and acid prior to extrusion thereof and wherein the composition also includes an organic sorbent selected from the group consisting of activated carbon, acid-activated calcium bentonite, and mixtures thereof.

6. A method in accordance with claim 5, wherein the acid and the alkali are in predominantly solid form when the calcium bentonite, acid and alkali are extruded.

7. A method in accordance with claim 1, wherein the sodium bentonite has a particle size less than about 800 μm.

8. A method in accordance with claim 1, wherein the sodium bentonite has a particle size less than about 700 μm.

9. A method in accordance with claim 1, wherein the sodium bentonite has a particle size less than about 650 μm.

10. A method in accordance with claim 1, wherein the calcium bentonite is ground to a particle size that is larger than the particle size of the sodium bentonite.

11. A method in accordance with claim 10, wherein the calcium bentonite is ground to a particle size of about 200 μm to about 850 μm after extrusion and the sodium bentonite has a particle size distribution of about 200 μm to about 650 μm.

12. A method in accordance with claim 11, wherein the calcium bentonite is ground to a particle size of about 300 μm to about 850 μm and the sodium bentonite has a particle size distribution of about 300 μm to about 650 μm.

13. A method in accordance with claim wherein the composition further includes a flocculating agent selected from the group consisting of a polymeric flocculant, activated carbon, talc, aluminum sulfate, ferric sulfate, and mixtures thereof.

14. A method in accordance with claim 1, wherein the sodium bentonite is ground to an average particle size smaller than an average particle size of the calcium bentonite.

15. A method in accordance with claim 14, wherein the calcium bentonite and acid are extruded at a moisture content of about 20% to about 45%, by weight, and then dried to a moisture content of about 15% by weight or less, and then ground to a desired particle distribution.

16. A method in accordance with claim 15, wherein the composition has a particle size less than about 1000 μm.

17. A method in accordance with claim 16 wherein the composition has a particle size in the range of about 200 μm to about 1000 μm.

18. A method in accordance with claim 17, wherein the sodium bentonite is ground to a particle size in the range of about 300 μm to about 600 μm and the calcium bentonite is ground to a particle size in the range of about 300 μm to about 850 μm.

19. A method in accordance with claim 15, wherein the extruded portion of the composition and a sodium bentonite-containing portion of the composition, maintained separate until after extrusion, comprise the following, in percent by total weight of the composition portions:

| | clay/chemical | wt. % |
|---|---|---|
| [First] Sodium Bentonite Portion | Na bentonite | 10–55 |
| | acid-activated calcium bentonite | 0–15 |
| | talc | 0–15 |
| [Second] Extruded Portion | Ca bentonite | 20–80 |
| | alkali | 0–15 |
| | activated carbon | 0–10 |
| | acid | 1–15 |

20. A method in accordance with claim 15, wherein the extruded portion of the composition and the sodium bentonite-containing portion of the composition comprise the following, in percent by total weight of the composition portions:

| | clay/chemical | wt. % |
|---|---|---|
| [First] Sodium Bentonite Portion | Na bentonite | 15–40 |
| | acid-activated calcium bentonite | 1–10 |
| | talc | 1–10 |
| [Second] Extruded Portion | Ca bentonite | 30–70 |
| | alkali | 0–10 |
| | activated carbon | 1–10 |
| | acid | 2–10 |

21. A method in accordance with claim 20, wherein the extruded portion of the composition and the sodium bentonite-containing portion of the composition comprise the following, in percent by total weight of the composition portions:

| | clay/chemical | wt. % |
|---|---|---|
| [First] Sodium Bentonite Portion | Na bentonite | 29.4 |
| | acid-activated calcium bentonite | 2.1 |
| | talc | 2.2 |
| [Second] Extruded Portion | Ca bentonite | 55.7 |
| | alkali | 3.8 |
| | activated carbon | 2.6 |
| | acid | 4.2 |

22. A method in accordance with wherein the composition portions are combined after extruding and pulverizing both portions separately.

23. A method in accordance with claim 19, further including a flocculant in an amount of about to about 15% by weight of the composition.

24. A method in accordance with claim 19, wherein the portions of the composition comprise the following, in percent by total weight of the composition portions:

| | | wt. % |
|---|---|---|
| [First] Sodium Bentonite Portion | Na bentonite | 29.5% |
| | acid-activated calcium bentonite | 1.0% |
| | talc | 2.1% |
| [Second] Extruded Portion | Ca bentonite | 53.9% |
| | alkali | 3.6% |
| | activated carbon | 2.5 |
| | acid | 4.0 |
| | flocculant | 3.4 |

25. A method in accordance with claim 24, wherein the flocculant is selected from the group consisting of a polymeric flocculant, talc, aluminum sulfate, ferric sulfate, and mixtures thereof.

26. A method in accordance with claim 19, wherein the composition portions comprise the following, based on the weight of the composition portion:

|  | clay/chemical | wt. % |
|---|---|---|
| [First] Sodium Bentonite Portion | Na bentonite acid-activated calcium bentonite talc | 70–100 0–30 0–30 |
| [Second] Extruded Portion | Ca bentonite alkali activated carbon acid, e.g., adipic | 40–98 1–40 0–30 1–40 |

27. A method in accordance with claim 26, wherein the composition includes about 1% to about by weight of a component selected from the group consisting of acid-activated calcium bentonite, talc, and mixtures thereof.

28. A method in accordance with claim 26, wherein the composition portions comprise the following, based on the total weight of the composition portion:

|  | clay/chemical | wt. % |
|---|---|---|
| [First] Sodium Bentonite Portion | Na bentonite acid-activated calcium bentonite talc | 50–96 2–15 0–15 |
| [Second] Extruded Portion | Ca bentonite alkali activated carbon acid | 50–94 2–20 2–15 2–20 |

* * * * *

UNITED STATES PATENT AND TRADEMARK OFFICE
CERTIFICATE OF CORRECTION

PATENT NO.    : 5,670,435
DATED         : September 23, 1997
INVENTOR(S)   : Kajita It is certified that error appears in the above-identified patent and that said Letters Patent is hereby corrected as shown below:

Column 20,
Line 21, delete "28".

Column 21,
Example 15, in the footnote, replace "Allied Colloide" with -- Allied Colloids --.

Column 25,
Example 20, in the footnote, replace "as" with -- and --.
Example 20, in the footnote, replace "harse" with -- harsh --.

Column 27,
Line 39, replace "with claim wherein" with -- with claim 1 wherein --.

Column 28,
Lines 4 and 7, "[First]" and "[Second]" are to be deleted.
Lines 21 and 23, "[First]" and "[Second]" are to be deleted.
Lines 36 and 40, "[First]" and "[Second]" are to be deleted.
Line 46, replace "in accordance with wherein" with -- in accordance with claim 19 wherein --.
Line 49, replace "of about to about" with -- of about 1% to about --.
Lines 57 and 60, "[First]" and "[Second]" are to be deleted.

Column 29,
Lines 9 and 13, "[First]" and "[Second]" are to be deleted.
Line 17, replace "1% to about by" with -- 1% to about 15% by --.

UNITED STATES PATENT AND TRADEMARK OFFICE
CERTIFICATE OF CORRECTION

PATENT NO.   : 5,670,435
DATED        : September 23, 1997
INVENTOR(S)  : Kajita It is certified that error appears in the above-identified patent and that said Letters Patent is hereby corrected as shown below:

Column 30,
Lines 10 and 13, "[First]" and "[Second]" are to be deleted.

Signed and Sealed this

Twenty-seventh Day of August, 2002

Attest:

Attesting Officer

JAMES E. ROGAN
Director of the United States Patent and Trademark Office